United States Patent
Saito

(10) Patent No.: US 6,753,916 B2
(45) Date of Patent: Jun. 22, 2004

(54) ELECTRONIC CAMERA AND METHOD OF REPRODUCING IMAGE THEREOF

(75) Inventor: Kenji Saito, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/991,657

(22) Filed: Nov. 26, 2001

(65) Prior Publication Data

US 2002/0063782 A1 May 30, 2002

(30) Foreign Application Priority Data

Nov. 27, 2000 (JP) ........................................ 2000-359625

(51) Int. Cl.⁷ ............................ H04N 5/222; H04N 5/76
(52) U.S. Cl. ................... 348/333.01; 348/231.9
(58) Field of Search ....................... 348/333.12, 333.05, 348/333.11, 240, 333.01, 231, 231.9; 345/669, 538, 671; 358/906

(56) References Cited

U.S. PATENT DOCUMENTS

| | | | | |
|---|---|---|---|---|
| 4,816,815 A | * | 3/1989 | Yoshiba | 340/750 |
| 5,734,427 A | * | 3/1998 | Hayashi | 348/333.01 |
| 6,512,548 B1 | * | 1/2003 | Anderson | 348/333.05 |
| 2001/0013897 A1 | * | 8/2001 | Kowno et al. | 348/240 |
| 2002/0158983 A1 | * | 10/2002 | Fellegara et al. | 348/333.11 |

FOREIGN PATENT DOCUMENTS

| | | | | |
|---|---|---|---|---|
| JP | 10023365 A | 1/1998 | | H04J/5/907 |
| JP | 11215455 A | 8/1999 | | H04J/5/765 |

* cited by examiner

Primary Examiner—Andrew Christensen
Assistant Examiner—Tia M. Harris
(74) Attorney, Agent, or Firm—Birch, Stewart, Kolasch & Birch, LLP

(57) ABSTRACT

The electronic camera is provided with an image pickup device which picks up an image, an image processing device which outputs the picked up image to a recording medium and at the same time records the image in a memory capable of executing a writing process or reading process with a speed higher than that of the recording medium, and a display device which displays the image. In case of reproducing and displaying the image, the image recorded in the memory is read and displayed on the display device, and therefore it is possible to reproduce and display the image in a short time.

11 Claims, 1 Drawing Sheet

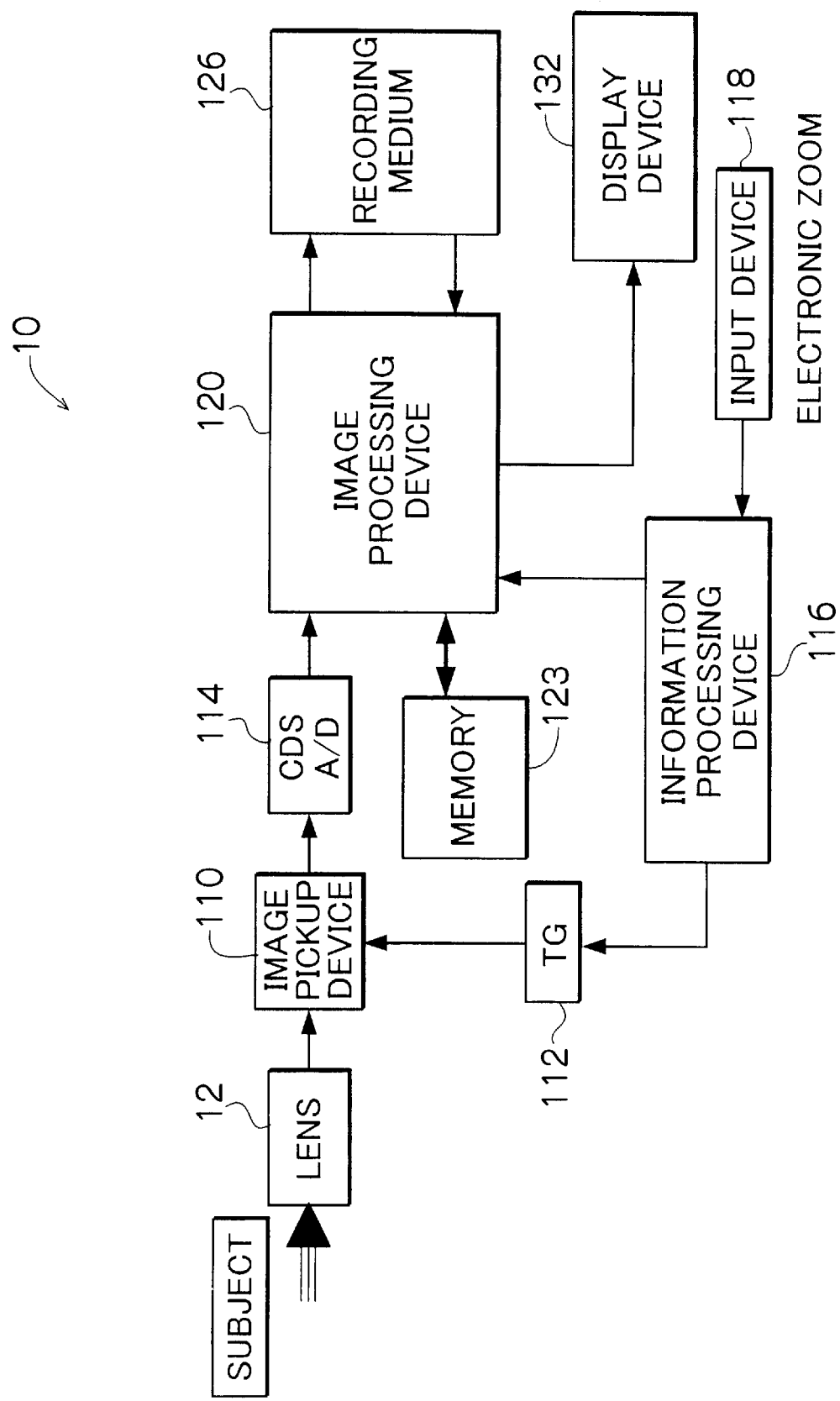

ELECTRONIC CAMERA AND METHOD OF REPRODUCING IMAGE THEREOF

BACKGROUND OF THE INVENTION

1. Field of the Invention

The present invention relates to an electronic camera and a method of reproducing its images, and in particular relates to an electronic camera capable of quickly reproducing and displaying captured images and a method of reproducing the images.

2. Description of the Related Art

In a conventional electronic camera, for checking once captured images, it is necessary to designate reproduction and display of the images after switching from a shooting mode with which the images are captured and recorded on a recording medium to a reproduction mode with which the images recorded on the recording medium are reproduced and displayed. As the recording medium which records a large amount of image data, a magneto-optical (MO) disk, a hard disk or the like available with relatively low cost for its recording capacity is used. Such recording medium generally requires a long time to read or write information thereon.

The electronic camera has caused to its user the inconvenience of waiting for a long time until captured images are reproduced and displayed because the images once recorded on the recording medium are read and then displayed after switching to the reproduction mode. Besides, in recent years, there has been a growth in use of electronic cameras equipped with an image pickup device of large number of pixels owing to development of the image pickup device and market demand. If an image is captured with a large number of pixels, the amount of data constituting the image extremely increases; and therefore, it requires a longer time to read the image data out of the recording medium and causes the inconvenience of taking a long time for checking the captured images.

Because the number of pixels in the image pickup device has greatly increased in recent years, it takes much more time than before to process the image data outputted from the image pickup device. Particularly, in the conventional electronic camera, processes of writing or reading to or from the recording medium are slow due to the characteristics of the nonvolatile recording medium, and therefore much time is spent on the processes. For example, for recording or reading the compressed data of image data having 2 million pixels outputted from the image pickup device, it requires about 2 seconds for recording or reading. Accordingly, it is necessary to wait for 12 seconds only for temporarily recording and reading image data of 6 million pixels, and in the actual image pickup process, the time required for the automatic exposure (AE), automatic focus (AF) or image processing is added; therefore, when immediately displaying the reproduced images for checking, the user may have an impression of very bad operability.

Japanese Patent Application Publication No. 10-23365 discloses a digital camera which enables high-speed image data recording by providing a plurality of recording media of low recording speed to a conventional electronic camera so as to simultaneously record pieces of image data on respective recording media. This conventional method of transferring image data of the digital camera is effective in successively recording or reproducing plural images, but imposes inconvenience that the time required to execute the process of reading the image data for reproducing the image of the first page is not at all shortened.

Japanese Patent Application Publication No. 11-215455 shows an image display device which increases a browsing speed, in browsing reduced image data in an image file with a browsing display mode, by shortening the display time for browsing per each frame if image data has a large number of frames. This conventional image display device reduces the time required to successive reproduction of images by shortening the display time per one frame of image, and therefore inconvenience also occurs that the time required to execute the process of reading the image data for reproducing the image of the first page cannot be shortened.

SUMMARY OF THE INVENTION

The present invention has been developed in view of the above-described circumstances, and has as its object the provision of an electronic camera capable of reproducing and displaying images in a short time when captured images are reproduced, and a method of reproducing images of the electronic camera.

In order to attain the above-described object, the present invention is directed to an electronic camera, comprising: an image pickup device which picks up an image; an image processing device which outputs the picked up image to a recording medium and at the same time records the image in a memory capable of executing a writing process or reading process with a speed higher than that of the recording medium; and a display device which displays the image, wherein, in reproducing and displaying the image, the image recorded in the memory is read and displayed on the display device.

According to the present invention, it becomes possible to reproduce and display the image in a short time.

BRIEF DESCRIPTION OF THE DRAWING

The nature of this invention, as well as other objects and advantages thereof, will be explained in the following with reference to the accompanying single drawing which is a block diagram showing a signal processing system of an electronic camera according to the present invention.

DETAILED DESCRIPTION OF THE PREFERRED EMBODIMENTS

Hereunder preferred embodiments of an electronic camera and a method of reproducing images of the electronic camera according to the present invention will be described in accordance with the accompanied drawing.

The single drawing is a block diagram showing a signal processing system of the electronic camera according to the present invention. As shown in the drawing, the electronic camera 10 comprises: a lens 12, which forms an image of the subject on a light-receptive surface of an image pickup device 110; the image pickup device 110, which outputs charges obtained by optoelectronic conversion of the image formed on the light-receptive surface by in vertical transfer and horizontal transfer; and a timing generator 112, which outputs, to the image pickup device 110, an OFD (overflow drain) signal corresponding to an electronic shutter or a vertical drive signal TV that serves as a command for executing vertical transfer of charges in the image pickup device 110.

The electronic camera 10 also comprises: a CDS-A/D 114 including a CDS (correlative double sampling circuit), which separates the signals outputted by the image pickup device 110 into a field-through level and a data level and outputs them as analog R, G, B signals corresponding to a filter matrix of the image pickup device 110 and an A/D converter which converts the analog R, G, B signal into a digital signal; an information processing device 116, which performs sampling timing control for image data, recording control and reproduction control for image data, communication control, display control or the like as well as control of the electronic camera 10 as a whole; and an input device 118 including a release button, communication button, transmission button, function switch, cross-shaped key, confirm switch, mode switch, start switch that gives instructions about start or halt of processing of the electronic camera 10, and so on.

Furthermore, the electronic camera 10 comprises: an image processing device 120, which performs processes such as sharpness correction, gamma correction, contrast correction, white-balance correction, YC conversion, data compression and zoom-in; a memory 123 constituted by an SDRAM or the like, capable of temporarily recording images to be reproduced and displayed and capable of becoming a workspace when a program is executed; a removable recording medium 126, which records data of captured images; and a display device 132, which displays images.

The recording medium 126 may be a removable recording medium typified by a semiconductor recording medium, a magnetic recording medium or an optical recording medium such as a memory card and an MO disk. The information processing device 116, image processing device 120, memory 123 and so forth may be connected to a bus line of multibits, which transmits information with high-speed, and the peripheral devices may be controlled by the command from the information processing device 116.

The capturing, reproduction and display processes of the electronic camera 10 configured as described above will be explained.

When the power of the electronic camera 10 is turned on and the capturing mode is set, an image to be captured by the electronic camera 10 is formed on the light-receptive surface of the image pickup device 110. The signals outputted by the image pickup device 110 are separated into the field-through level and data level by the CDS-A/D 114, converted from the analog R, G, B signals into the digital R, G, B signals, and transmitted to the memory 123 through the image processing device 120. The image processing device 120 performs, for the image data temporarily recorded in the memory 123, noise reduction process, sharpness correction, gamma correction, contrast correction, white-balance correction, YC conversion and so on, and records, in the memory 123, the image signals having been converted into image data with the number of pixels and a tone for displaying, and outputs them to the display device 132. On receiving the image signals, the display device 132 displays the image.

When the release button provided to the input device 118 is pressed, the mode of capturing the subject is set. Then, the information processing device 116 provides the image processing device 120 with instructions to execute a compression process such as Joint Photographic Experts Group (JPEG) format for the image data recorded in the memory 123 as required. The images subjected to compression process to have a predetermined form in the image processing device 120 are successively recorded on the recording medium 126 through a recording medium interface (not shown), and at the same time, image data converted to have the number of pixels and a tone for display is recorded in the memory 123. At this time, a compression process may be performed on the display image data to be recorded in the memory 123 as required.

When the process mode provided to the input device 118 of the electronic camera 10 is set to the reproduction mode and an image is selected, the image processing device 120 reads the image data recorded in the memory 123, converts the read image data into an image signal for display, and outputs the image signal to the display device 132.

The information processing device 116 provides instructions to refer to a specified image file recorded on the recording medium 126 and load image data into the image processing device 120. The image data read out of the recording medium 126 is extended in the image processing device 120 as required by an extension method such as JPEG and temporarily recorded in the memory 123.

For reducing the time required for displaying the reproduced images, the captured image data subjected to the YC conversion is reduced to have the number of pixels suitable to the resolution of the display device 132 as required, further compressed by a compression method such as JPEG as required, and recorded in the memory 123 prior to recording the image data on the recording medium 126. The process will be described hereinunder.

As an example, the recording process after capturing by the electronic camera 10 will be explained, in which the number of pixels of the image data outputted from the image pickup device 110 is 1.3 million. An image signal (for example, 1,280×960 pixels) subjected to the YC conversion in the image processing device 120 is compressed by a compression processing device using a method such as JPEG provided to the image processing device 120, and transferred to the recording medium 126 and recorded thereon.

The image signal subjected to the YC conversion is also subjected to the reduction conversion in the image processing device 120 to have the number of pixels of about 320×240 suitable for display on the display device 132, which is, for example, a liquid crystal monitor, and recorded in the memory 123. When the next capturing is performed, the image data for display already recorded in the memory 123 may be deleted. If there is free space in the memory 123, plural pieces of data of captured images for display may be recorded.

If the user desires to reproduce the image captured this time and to check it, the user operates the input device 118 to input an instruction to reproduce the image captured this time. In accordance with the input instruction of reproducing, the information processing device 116 of the electronic camera 10 reads the display image data of the image captured this time recorded in the memory 123 capable of high-speed reading and writing of image data, instead of reading the image data recorded this time from the recording medium 126, and displays the image on the display device 132. Since the time required to read image data having, for example, 320×240 pixels and color tone of 24 bits from the memory 123 constituted by the SDRAM or the like is about 0.6 seconds, the user is able to browse the desired reproduced image instantly after offering instruction to reproduce the image.

If the memory 123 is constituted by DRAM or the like, which is a volatile memory, recorded image data is deleted by the power shutdown of the electronic camera 10; therefore, a standby state in which the memory 123 is refreshed even though the power of the electronic camera 10 is shutdown may be set.

If the standby state is not set, after the user operates the start switch to start the process of the electronic camera 10

(including the process of turning on the power) or during displaying the data in the memory 123, for example, one or more pieces of image data recorded on the recording medium 126 may be read in advance by the background processing of the starting processing executed by the information processing device 116, and converted into the display image data and recorded in the memory 123 regardless of the presence or absence of instruction of reproducing and displaying the image by the user.

If the user provides an instruction of zoom-magnification display for the image data having small number of pixels suitable for display recorded in the memory 123, electronic zoom-magnification processing using the data having small number of pixels causes further deterioration in resolution and results in a displayed image of a deteriorated quality, which is hard to see. To prevent the deterioration of image quality, the reduced image for display may be firstly displayed, and at the same time, the original image may be read from the recording medium 126 to be subjected to the electronic zoom-in processing with full pixel display, and then the reduced image displayed on the display device 132 may be switched to the original image read from the recording medium 126.

As described so far, according to the electronic camera and the method of reproducing the image of the electronic camera of the present invention, an image pickup device which picks up an image, an image processing device which outputs the picked up image to a recording medium and at the same time records the image in a memory capable of executing a writing process or reading process with a speed higher than that of the recording medium, and a display device which displays the image are provided, and in reproducing and displaying the image, the image recorded in the memory is read and displayed on the display device. Accordingly, it becomes possible to reproduce and display the image in a short time.

Consequently, even though an electronic camera has a large number of recording pixels, captured images can be instantly reproduced and displayed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera having a capturing mode and a reproducing mode, comprising:
    an image pickup device which picks up an image in the capturing mode;
    an image processing device which, in the capturing mode, records the picked up image in a recording medium and at the same time records the image in a memory capable of executing at least one of a writing process and a reading process with a speed higher than that of the recording medium; and
    a display device which displays the image;
    wherein, in the reproducing mode, the image processing device reads the image recorded in the capturing mode from the recording medium and the memory and displays the read image on the display device,
    wherein a user, through an input, is able to select between the reproducing mode and the capturing mode,
    wherein the user is able to select, in the reproducing mode, between different picked-up images recorded in at least one of the recording medium and the memory during the capturing mode, and
    wherein when the electronic camera is switched to the reproducing mode, the electronic camera displays an image which has been originally stored in the memory, which is a working memory, and after that, when the electronic camera receives an instruction to reproduce an image which has not been stored in the working memory, the electronic camera reads out from the recording medium an image which corresponds to the instructed image, and displays the image.

2. The electronic camera as set forth in claim 1, wherein the memory is a volatile memory.

3. The electronic camera as set forth in claim 1, further comprising: a starting switch which starts a process of the electronic camera, wherein, when the process of the electronic camera is started by the starting switch, the image processing device reads the image recorded on the recording medium and records the image in the memory.

4. The electronic camera as set forth in claim 1, wherein, in case of recording the image in the memory, the image processing device converts an image into the image having at least one of a number of pixels and a tone suitable for display by the display device.

5. The electronic camera as set forth in claim 1 compresses the image and records it in said recording medium, and in case of reproducing and displaying the compressed and recorded image, extends the compressed image for producing a display image and displays the image on the display device.

6. The electronic camera as set forth in claim 1, wherein, if an instruction of performing zoom-magnification display of an image to be reproduced and displayed is provided in reproducing and displaying the image, the image recorded in the memory is read and displayed on the display device at first, and after that the image recorded on the recording medium is read and subjected to a zoom-magnifying process, and the image displayed on the display device is switched to the image subjected to the zoommagnifying process.

7. The electronic camera as set forth in claim 1, wherein, when the image in the memory is reproduced and displayed, the corresponding image is read from the recording medium.

8. A method of reproducing an image of an electronic camera having a capturing mode and a reproducing mode, said method comprising the steps of:
    outputting the picked up image, during the capturing mode, to a recording medium and at the same time recording the image in a memory capable of executing at least one of a writing process and a reading process with a speed higher than that of the recording medium; and
    reading the image recorded in the capturing mode from the recording medium and the memory and displaying the image on a display device when reproducing and displaying the image, during the reproducing mode,
    wherein a user, through an input, is able to select between the reproducing mode and the capturing mode,
    wherein the user is able to select, in the reproducing mode, between different picked-up images recorded in at least one of the recording medium and the memory during the capturing mode, and
    wherein when the electronic camera is switched to the reproducing mode, the electronic camera displays an image which has been originally stored in the memory, which is a working memory, and after that, when the electronic camera receives an instruction to reproduce an image which has not been stored in the working memory, the electronic camera reads out from the recording medium an image which corresponds to the instructed image, and displays the image.

9. An electronic camera having a capturing mode and a reproducing mode, comprising:

an image pickup device for capturing an image during said capturing mode;

a display device for displaying, during said capturing mode, a captured image in response to an external input; and an image processing device for outputting a processed image to a recording medium in a predetermined format and simultaneously recording said processed image in a memory in a format appropriate for display, during said capturing mode, wherein said recording medium and said memory output said processed image to said display device, during said reproducing mode, and wherein a user, through an input, is able to select between said reproducing mode and said capturing mode, wherein the user is able to select, in the reproducing mode, between different picked-up images recorded in at least one of the recording medium and the memory during the capturing mode, and wherein when the electronic camera is switched to the reproducing mode, the electronic camera displays an image which has been originally stored in the memory, which is a working memory, and after that, when the electronic camera receives an instruction to reproduce an image which has not been stored in the working memory, the electronic camera reads out from the recording medium an image which corresponds to the instructed image, and displays the image.

10. The electronic camera according to claim 9, wherein said image processing device inputs a processed image from said recording medium and outputs said processed image to said memory, said memory outputting said processed image to said display.

11. A method of reproducing an image of an electronic camera, comprising the steps of:

capturing an image in a image pickup device in response to an external input during a capturing mode;

receiving said image from said image pickup device into an image processing device;

processing said image in said image processing device;

recording said image in a recording medium in a predetermined format and simultaneously recording said image in a memory in a format appropriate for display, said recording being performed during said capturing mode; and outputting said image from said recording medium and said memory to a display device during a reproducing mode, wherein a user, through an input, is able to select between the reproducing mode and the capturing mode, wherein the user is able to select, in the reproducing mode, between different picked-up images recorded in at least one of the recording medium and the memory during the capturing mode, and wherein when the electronic camera is switched to the reproducing mode, the electronic camera displays an image which has been originally stored in the memory, which is a working memory, and after that, when the electronic camera receives an instruction to reproduce an image which has not been stored in the working memory, the electronic camera reads out from the recording medium an image which corresponds to the instructed image, and displays the image.

* * * * *